United States Patent [19]

Marlowe

[11] Patent Number: 5,275,544
[45] Date of Patent: Jan. 4, 1994

[54] APPARATUS FOR MOULDING FOAM

[75] Inventor: Delane Marlowe, Mooresville, N.C.

[73] Assignee: Unifoam AG, Glarus, Switzerland

[21] Appl. No.: 691,211

[22] Filed: Apr. 30, 1991

Related U.S. Application Data

[63] Continuation-in-part of Ser. No. 304,515, Jan. 31, 1989, abandoned.

[51] Int. Cl.⁵ .................. B29C 39/06; B29C 39/36; B29C 33/10
[52] U.S. Cl. .................. 425/4 R; 249/82; 249/113; 249/141; 249/158; 249/170; 264/51; 425/442; 425/453; 425/454; 425/812; 425/817 R
[58] Field of Search .............. 425/4R, 249/82, 155, 158, 113, 139; 264/51; 425/4C; 425/817R; 425/817C; 425/453; 425/546; 425/442; 425/DIG. 201; 264/DIG. 84; 264/37;425/62; 425/117; 425/127; 425/451.5; 425/812, 441; 249/170, 141

[56] References Cited

U.S. PATENT DOCUMENTS

| | | | |
|---|---|---|---|
| 2,948,926 | 8/1960 | Kuhn | 425/442 |
| 3,642,400 | 2/1972 | Theodorsen | 249/162 |
| 3,712,780 | 1/1973 | Jope et al. | 425/812 |
| 3,719,445 | 3/1973 | Sindelar | 425/451.5 |
| 3,752,437 | 8/1973 | Saidla | 425/442 |
| 3,931,951 | 1/1976 | Fougea | 249/158 |
| 3,937,609 | 2/1976 | Ryder | 425/546 |
| 3,963,395 | 6/1976 | Bourdo | 425/817.12 |
| 3,970,732 | 7/1976 | Slaats et al. | 425/812 |
| 4,008,990 | 2/1977 | Hiemer et al. | 425/812 |
| 4,030,863 | 6/1977 | MacMillan | 425/812 |
| 4,047,860 | 9/1977 | Dinzburg et al. | 425/812 |
| 4,090,833 | 5/1978 | Saidla | 425/812 |
| 4,276,008 | 6/1981 | Montgomery et al. | 425/812 |
| 4,285,893 | 8/1981 | Contastin | 425/817 R |
| 4,360,335 | 11/1982 | West | 485/451.5 |
| 4,456,443 | 6/1984 | Rabotski | 249/158 |
| 4,472,339 | 9/1984 | Ploeg et al. | 249/113 |
| 4,530,807 | 7/1985 | Vreenegoor | 425/817 R |
| 4,573,902 | 4/1986 | Heilman et al. | 425/817 R |
| 4,601,864 | 7/1986 | Vreenegoor | 425/817 R |
| 4,737,091 | 4/1988 | Fiorentini | 425/817 R |
| 4,867,662 | 9/1989 | Shimahara et al. | 249/113 |

FOREIGN PATENT DOCUMENTS

| | | | |
|---|---|---|---|
| 231619 | 2/1964 | Austria | 425/812 |
| 50-36869 | 11/1975 | Japan | 425/812 |

*Primary Examiner*—Khanh Nguyen
*Attorney, Agent, or Firm*—W. Thad Adams, III

[57] ABSTRACT

An apparatus is provided for moulding a polymeric foam into a bun in a longitudinally-extending, channel shaped mould by a mobile vessel and fall plate which are progressively transported from one end to the other of the mould to lay down partially-expanded foam over the bottom of the mould. The apparatus includes a mould for receiving a polymeric foam and including a longitudinally-extending, channel-shaped enclosed mould through which a mobile vessel and fall plate are progressively transported from one end to the other of the mould to lay down partially-expanded foam over the bottom of the mould while the mould is in a moulding position. Gas is vented from the interior of the mould and the mould is moved from the moulding position to a curing position remote from the moulding position where the bun cures in the mould.

28 Claims, 12 Drawing Sheets

APPARATUS FOR MOULDING FOAM

CROSS REFERENCE TO RELATED APPLICATIONS

This application is a continuation-in-part application of U.S. Ser. No. 304,515 filed Jan. 31, 1989 now abandoned.

BACKGROUND OF THE INVENTION

This invention relates to a method of and apparatus for the manufacture of slab-stock polymeric foam, such as polyurethane foam of the type used in seats, cushions and the like.

In the production of polyurethane foam reactants, in particular surfactants, catalysts, blowing agents and modifiers, are thoroughly mixed and deposited into a mold. The reactants are polyol, isocyanate, for example toluene di-isocyanate (TDI), and water. Polyol reacts with the TDI to form urethane linkages that build the polymer. TDI reacts with water to produce carbon dioxide which blows the foam. Additional water lowers the density of the foam and also increases exothermic heat output. This heat limits water blown foams to a density of 19.2 Kg/m$^3$ at an atmospheric pressure of 1 bar.

At this density temperatures inside large foam buns will reach or exceed 177 degrees C. and remains high for several hours—the foam acting as its own insulation. These high temperatures create the possibility of auto oxidation leading to scorching or even fire.

Inert blowing agents such as CFC-11 (also known as chlorofluorocarbon-11 or fluorotrichloromethane) or methylene chloride are used to produce lower density and softer foams. These materials soften the foam by reducing the number of hard segments of the polymer caused by water for any given density. The other active ingredients are a silicone surfactant which stabilizes the gas bubbles and permits efficient use of the foam blowing gases, a polymer building catalyst such as stannous octoate, a gas producing catalyst that catalyzes the isocyanatewater reaction such as an amine compound, and various modifiers such as colours, anti-static agents and combustion modifiers.

The mould into which the expanding foam is introduced takes the form of a channel with stationary or moving sidewalls 122 cm. to 152 cm. high and a bottom conveyor usually about 244 cm. wide. One or both the sidewalls may be adjustable so that variable width foam buns can be made.

Foam is deposited onto the bottom of the channel by means of a lay-down assembly including a trough having a volume of approximately 100 litres. As the foam expands, it spills out of the trough into the channel.

Foam expansion takes approximately 75 to 180 seconds depending on the foam formulation. The foam rises freely in the production channel until it reaches maximum height. As the foam cells break open they release the gases of expansion which are hot from the exothermic reaction heat. These gases are mainly carbon dioxide and the inert blowing agents CFC-11 and methylene chloride. These hot gases pull small amounts of TDI vapours and possibly some of the other components with them. TDI is a dangerous respiratory irritant and regulations in the USA at least require a maximum exposure of 0.02 parts per million in the workplace.

To meet this requirement and to minimize CFC-11 and methylene chloride vapours, foam plants typically have extensive high capacity ventilation systems that expel large volumes of air from the foam production areas. It is difficult to get all of these chemical vapours out of the plant so that workers are exposed to acceptable levels of these chemical vapours. Even so, exhausting these chemicals into the atmosphere is now suspected of causing injury to the environment, for example by damaging the ozone layer of the atmosphere, and by causing smog.

DESCRIPTION OF RELATED ART

An apparatus for producing foam in a substantially enclosed environment is disclosed in U.S. Pat. No. 4,530,807. According to this patent a mobile vessel and fall plate are progressively transported along the length of a stationary open top mould which is covered as the foam is generated and expands in the mould. Means are provided for removing gases of generation from the mould. As the known apparatus requires the use of a stationary mould, production rates are limited, since the foam bun must be allowed to cure in the mould so that curing conditions can be controlled and gases can be removed for disposal.

In U.S. Pat. No. 4,601,864 there is disclosed another stationary mould with means for removing and recycling gases of generation while maintaining the pressure in the mould at substantially atmospheric pressure. In this case also, the foaming mixing head and supply equipment is largely idle while the foam in the mould cures and the gases of expansion are removed.

SUMMARY OF THE INVENTION

The aim of the present invention, therefore, is to increase the production rates which can be achieved in polymeric foam manufacturing plants in which the foam reactants are deposited into stationary moulds which are substantially closed for the collection of gases.

According to one aspect of the present invention there is provided a method of moulding polymeric foam comprising the steps of transporting a mobile trough and fall plate along an elongate mould while delivering foam reactants to the trough, thereby to lay down partially expanded foam over the bottom of the mould, and as the mould is charged with foam, and during curing of said foam, exhausting gases from the mould through venting means provided thereon, said exhausted gases being conducted from the mould for processing and/or disposal, characterised by the steps positioning the mould at a filling station before laying down the foam therein, after charging the mould with foam closing said venting means to seal substantially closed the mould and moving the mould to a curing position remote from the filling station, and extracting gases from the foam at the curing position by connecting the venting means to gas extraction equipment.

According to another aspect of the invention there is provided a plant for the production of polymeric foam comprising a mould having top and bottom walls, opposed side walls and end walls, gas venting means for venting gases from the interior of the mould, gas exhausting means connected to the venting means for conducting gas exhausted from the mould as the mould is charged with foam, a mobile trough and fall plate transportable along the mould, and means to deliver foam reactants to the trough as the trough and fall plate are transported along the mould, characterised in that mould conveying means is provided for conveying the mould from a filling station at which the mould is located during charging with foam to a curing position remote from the filling station, gas extraction means is provided for connection to the venting means of the mould at the curing position, and the mould includes means for closing the venting means during transfer of the mould from the filling station to the curing position.

With the method and apparatus of the invention, a large mould filled with a curing foam bun is moved to a curing position remote from the filling station and another empty mould is moved to the filling station and filled.

Some gases of generation can be removed from the mould at the filling station to control pressure within the mould until the mould is removed to the curing position, at which time the gases of generation are removed from the mould for disposal or recycling.

Conditioned gas can be introduced into the mould at the curing position while the bun is curing to assist the extraction of the gases of generation. Preferably the conditioned gas is introduced at the top of the mould and the gases of generation are exhausted from the bottom of the mould. In addition, the gases of generation can be removed from the mould during charging of the mould at a rate different than the rate of gas generation within the mould to thereby control the pressure within the mould and thereby the properties of the cured foam.

For moving the moulds from the filling station to the curing position an overhead conveyor is preferably used. Conveniently, at the curing position the moulds are arranged in a plurality of vertically-stacked ranks and files.

According to a preferred construction the mould comprises a longitudinally-extending, channel-shaped enclosed casing through which the mobile vessel and fall plate are progressively transportable from one end to the other of the mould to lay down partially-expanded foam over the bottom of the mould while the mould is at the moulding station. Gas venting means are attached to the casing to vent gases from the interior of the mould. The gas venting means may be pipes which also serve to reinforce the casing which in turn can be of relatively lightweight construction to facilitate movement between the filling station and the curing position.

Preferably, the gas venting means includes valves adapted to close the mould against the escape of gases therefrom when the mould is moved from the filling station to the curing position, and to open the venting means when the mould is in the curing position to permit gases of generation to be extracted from the mould and conditioned gas to be supplied to the mould.

The mould can be at least 10 metres long, and preferably is at least 30 metres long.

In accordance with known practice in the manufacture of polymeric foam the bottom and at least the lower portions of the sides of the mould are preferably covered with a liner, e.g. a polyethylene foil, to assist removal of the cured foam. In this case means may be provided on the mould for perforating the bottom liner for allowing gases of generation to be removed therefrom.

In a preferred construction the mould has inner side walls which are movable to vary the width of the foam moulding channel defined between them, and means operable to move the inner side walls inwardly during movement of the mould from the filling station to the curing station. The inner side walls have vent openings near their lower edges and means, such as an apertured sliding plate is provided for opening and closing these openings.

The mould preferably comprises door means in one side for removing the cured bun from the mould. For example the bottom of the casing may be hinged at one side for this purpose.

Preferably the mobile vessel comprises a trough of novel construction enabling the trough to be progressively collapsed from the bottom to expel the foam mixture in the trough. Conveniently the trough comprises a rigid back plate and a front plate which is movable against the back plate to collapse the trough. The front plate may be flexible, e.g. a wire mesh, with means such as a roller for gradually pressing it against the rigid back plate. Where the front wall is a mesh a liner of flexible sheet material can be provided in the trough to retain the liquid foam mixture.

The foam mixture is preferably delivered to the trough from a mixing chamber mounted directly on the trough and arranged to mix the liquid components by their impingement upon delivery into the mixing chamber, with means being provided for emptying the contents of the mixing chamber into the trough at the end of a mould filling run.

BRIEF DESCRIPTION OF THE DRAWINGS

A full understanding of the invention will be had from the following detailed description, reference being made to the accompanying drawings in which.

DESCRIPTION OF THE PREFERRED EMBODIMENT(S)

Referring now specifically to the drawings, the sequence of operation of a moulding process by which the invention of this application is practiced is illustrated in FIGS. 1-5, inclusive. The production channel comprises a mould 10 which may be a variety of sizes but in the preferred embodiment disclosed in this application comprises a casing or box fabricated of mutually opposed top, bottom and side sheet metal segments which collectively define a mould 10 which is 30 metres long, 127 cm. high and 244 cm. wide. Mould 10 is stationary during the mould filling process. Two mobile units 11, 12 are provided. The first mobile unit 11 comprises a fall plate mobile and the second mobile unit 12 comprises a chemical holding vessels for the reactants and pumping means for delivery the reactants to a mixing trough 14. For convenience the two mobile units are referred to hereinafter as the fall plate mobile and the chemical pumping mobile. They are driven remotely along the mould and no human operators are exposed to any chemical fumes.

The mobile 12 also carries a roll 90 (FIG. 1) of polyethylene liner film "P" which is arranged to be supplied over the fall plate mobile. The liner film is when stored on the roll folded laterally in three equal layers, the width of the folded film being 91.5 cms. As the film is unwound from the roll it is spread out the full width of 274.5 cms. by a pair of nip rollers 91 so that the liner will cover the full width of the mould bottom and form a turn up of about 10 cms. at each side.

Figure 1:
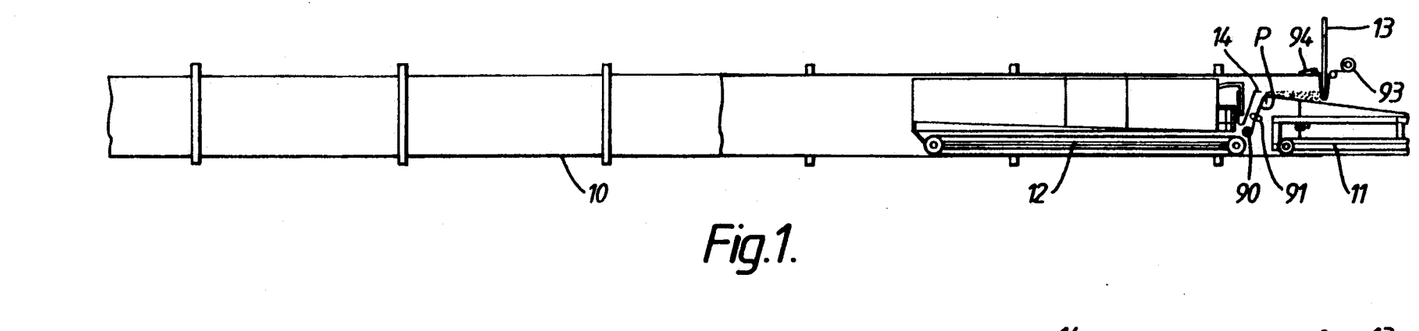
FIGS. 1-5 inclusive are fragmentary sequential views of the moulding process in connection with which the invention is practiced.

At the start of the foam pour, mobiles 11 and 12 are moved into mould 10 to the initial position as is shown in FIG. 1. A vertically slidable front end wall or door 13 is raised and rests with its lower edge on the inclined bed of the fall plate mobile 11 near its higher end and near the chemical mixing trough 14 carried on the adjacent end of chemical pumping mobile 12. The door 13 has associated with it a roll 93 (FIG. 1) of polyethylene liner film which is pulled from the roll as the door is lowered to provide a liner on the inside of the door, the free edge of the film being held by a clamp 94 on the top of the mould. When the mobiles are in the initial position approximately 6.7 m. of the fall plate mobile 11 protrudes out the front of mould 10.

Fall plate mobile 11 is covered with the polyethylene liner film "P". The polyethylene film "P" keeps the foaming material off the fall plate mobile 11 and the 10 cm. of turn-up prevents foam from leaking down the gap between the fall plate mobile 11 and the mould 10. The free edge of the film at the lower edge of the inclined bed of the fall plate is fixed to the floor by a clamp bar (not shown).

When the separate constituents of the foam are mixed in the trough 14, they expand as the reaction takes place and spill out of the trough 14 onto the fall plate mobile 11. The door 13 and its liner prevent any leakage from the end of the mould.

Figure 2:
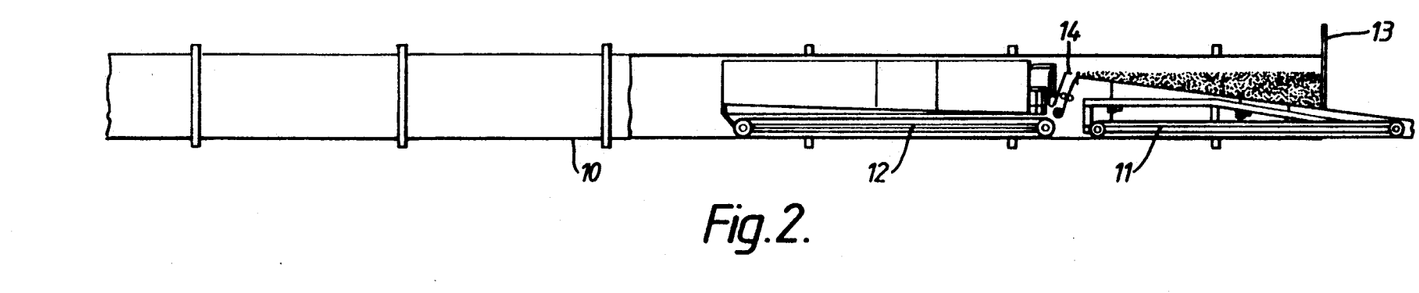
Figure 3:
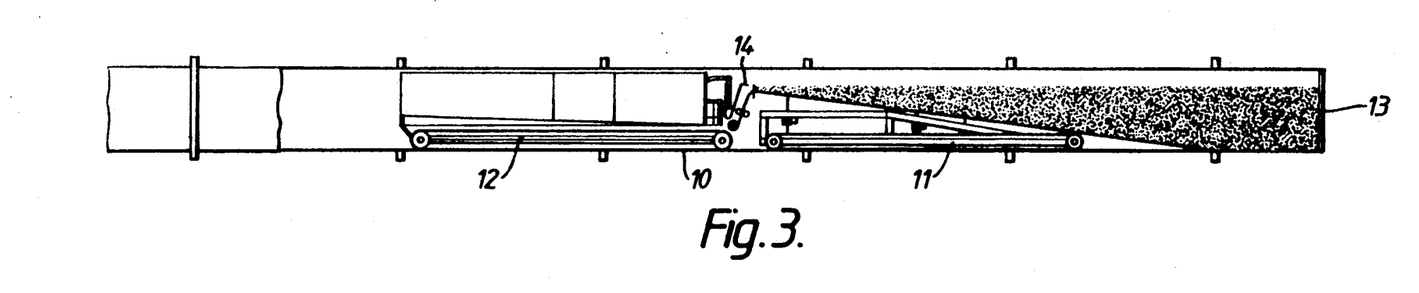
Figure 4:
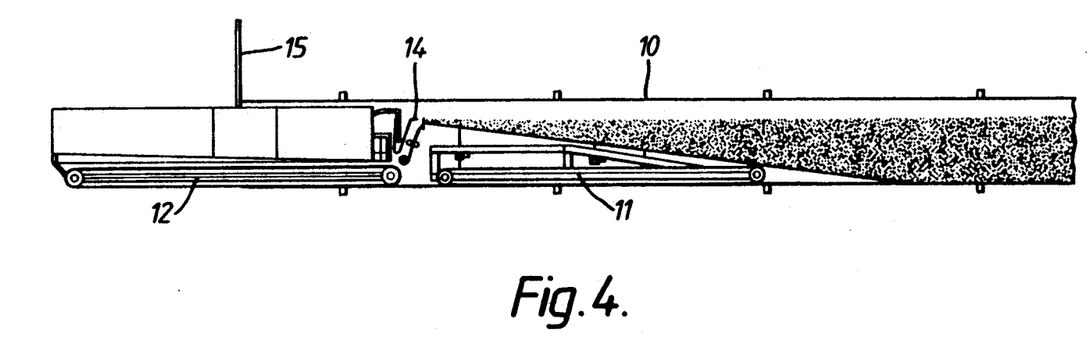
Figure 5:
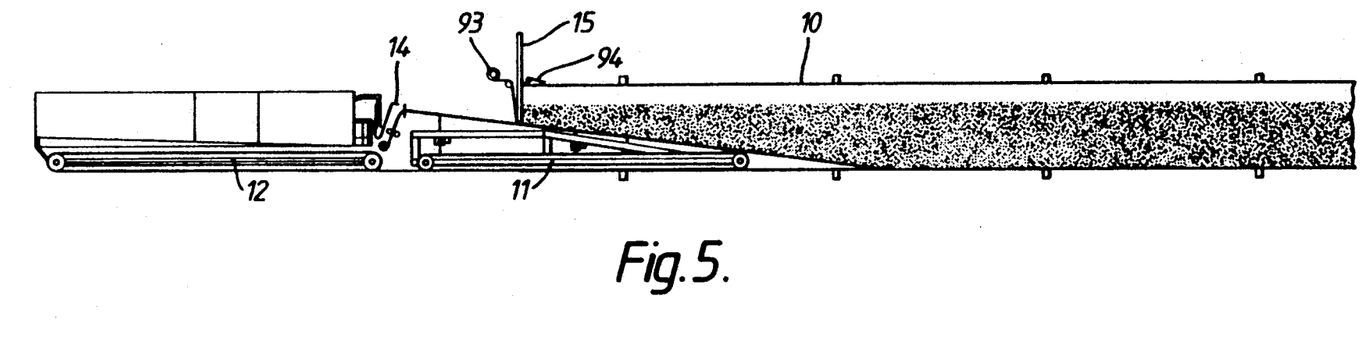

The two mobiles 11, 12 are then driven along the mould, as shown in FIG. 2. After approximately 6.7 m. of travel the front of the fall plate mobile has moved completely within mould 10, allowing front door 13 to close with a full height of foam against it. The decline of the fall plate mobile lowers the foam to the bottom of the mould 10 at approximately the same rate as the foam is expanding. This allows most of the foam expansion to occur in the downward direction which reduces the effects of gravity and friction on the configuration of the foam bun which results. The liner film on the inside of door 13 prevents the foam being pulled down with it as the door is lowered. As is shown in FIGS. 3, 4 and 5, mobiles 11 and 12 move progressively backwards as foam spills onto the fall plate and into the mould 10. When the mobiles 11 and 12 reach the rear end of the mould 10, chemical pumping ceases, and all of the foam is emptied out of the trough 14 and onto the fall plate mobile 11. A vertically-movable rear door 15 rests on fall plate mobile 11 (FIG. 5) until fall plate mobile 11 is completely withdrawn from mould 10, whereupon door 15 closes. The door 15 is similar to the door 13 and also has associated with it a roll 93 of liner film and a clamp 94 to secure the free end of the film. Mould 10 now contains a 30 m. long bun of foam which must cure. Means are provided for severing the ends of the liner P at the ends of the mould and for severing the liner films covering the end doors 13, 15 from their rolls 93.

Figure 6:
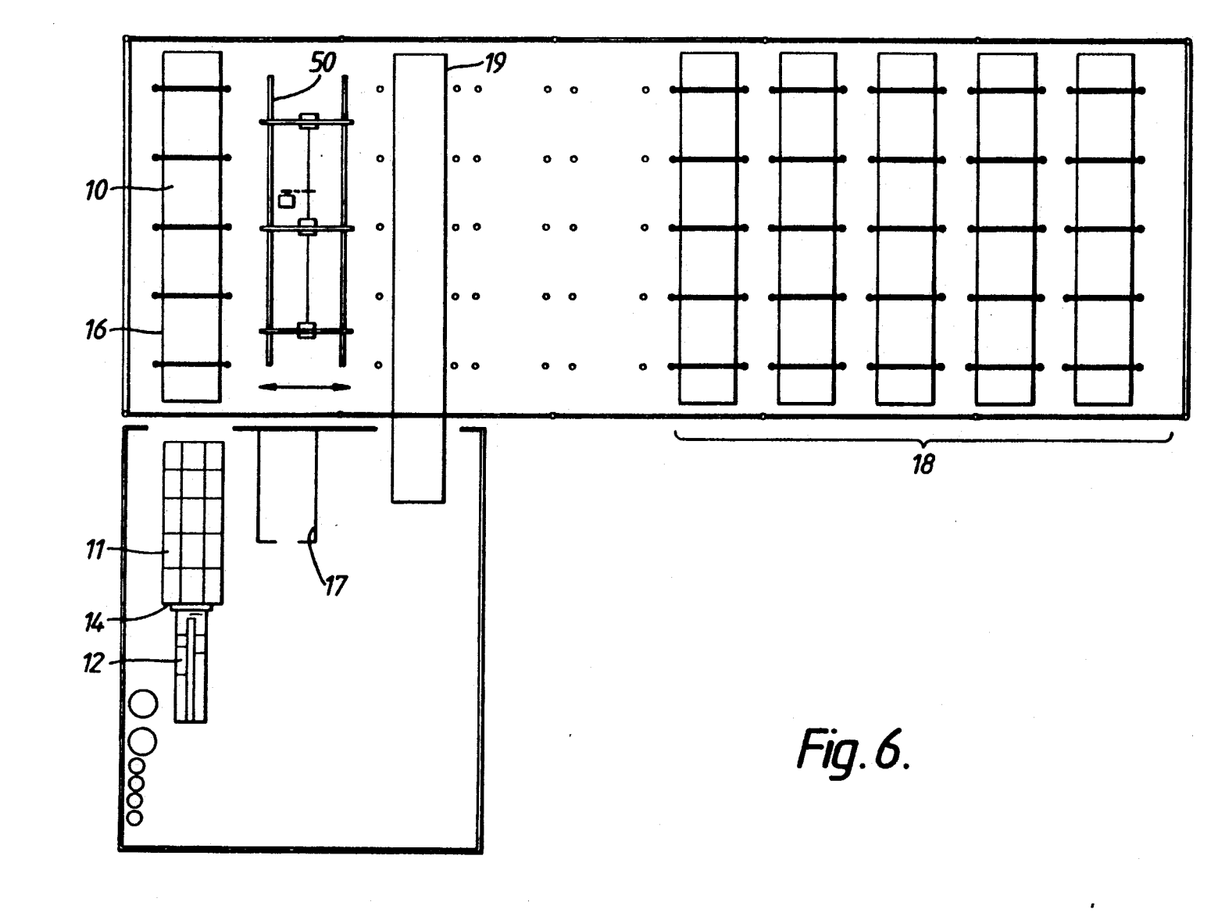
FIG. 6 is a plan view of a plant for moulding foam according to the invention.

Referring now to FIG. 6, a plant layout is shown by which the method of the invention is practiced with the apparatus of the invention. Mould 10 is positioned at a filling or pouring station 16 to receive the chemical pumping mobile 12 and the fall plate mobile 11. A separate room 17 contains all of the process controls necessary to carry out the moulding and curing operations. An overhead crane 20 lifts moulds 10 from the pouring station 16 and moves them to a curing station 18 where in the particular embodiment shown in FIG. 6 twenty-five moulds 10 (five ranks stacked five high) can be placed for curing. After curing, and removal of the bun from the mould 10 at a conveyor 19, conveyor 19 moves the bun downstream for shipment or further processing.

It should be understood that FIG. 6 is essentially schematic and it does not show the additional space which is needed at the upper end (as shown) of the mould at the filling station to accommodate the fall plate mobile at the start of the filling operation.

Figure 7:
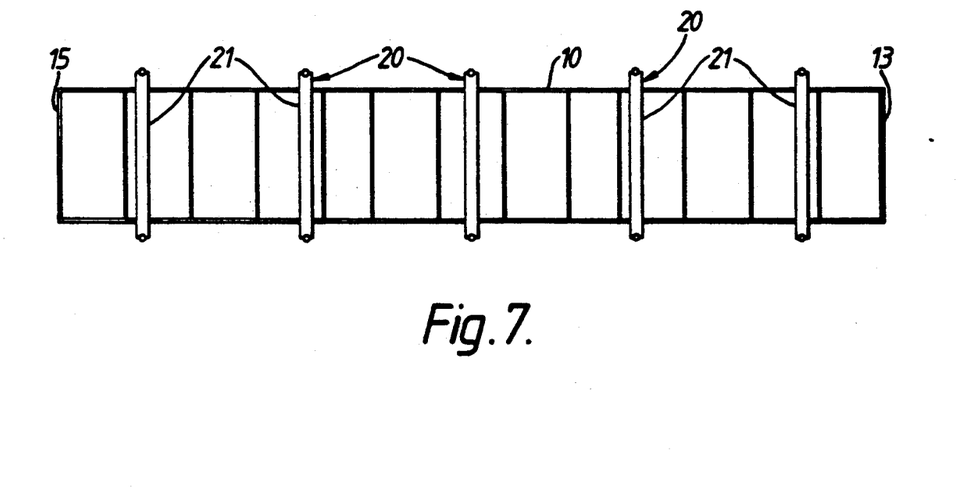
FIG. 7 is a plan view of a mould according to the invention.
Figure 8:
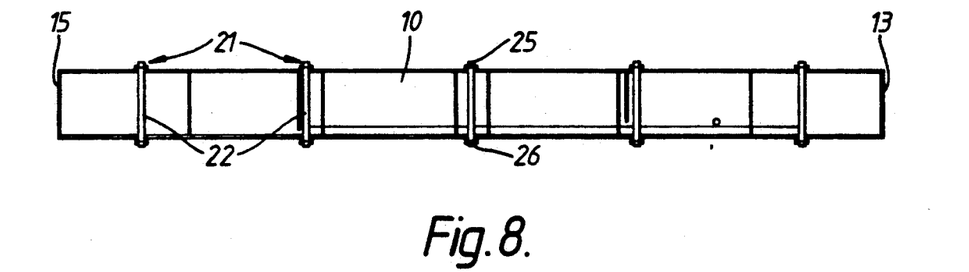
FIG. 8 is a side elevation of the mould illustrated in FIG. 7.
Figure 9:
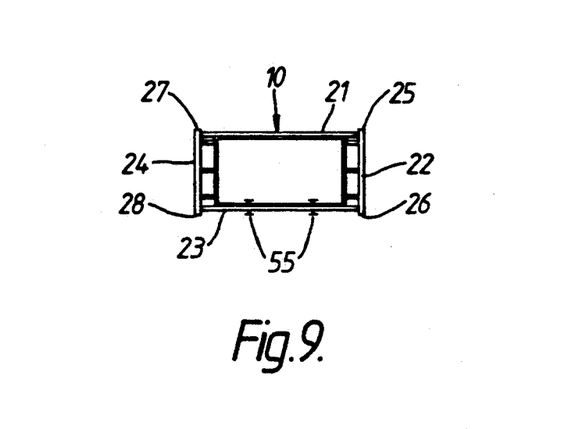
FIG. 9 is an end elevation of the mould illustrated in FIGS. 7 and 8.
Figure 12:
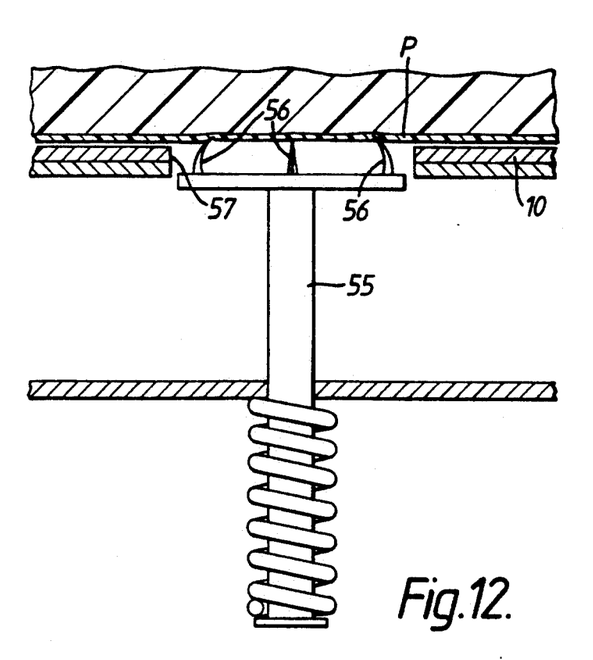
FIG. 12 is a fragmentary vertical view of a plunger which punctures a plastic liner in the mould to permit removal of gas from the mould.

Referring now to FIGS. 7, 8 and 9, the construction of the mould 10 is explained in further detail. As mentioned above the mould has a casing or box formed by sheet metal panels defining top, bottom and opposed side walls. The casing is reinforced by frameworks 20 extending around the casing at locations spaced apart along its length e.g. at about 3 meter intervals. The frameworks are defined by tubes of rectangular section and also constitute the gas venting means of the mould. Each framework includes an upper transverse tube 21 which extends across the top wall of the casing and communicates directly with the interior of the mould through holes in the tube and top wall, a right side vertical tube 22 which is in constant communication with tube 21, a lower transverse tube 23, and a left side vertical tube 24 in constant communication with tube 23. The bottom wall of the casing is hinged to the left side wall to define a door which can be opened to remove the cured foam bun, as explained in more detail below with reference to FIG. 15, and the tube 23 includes a flexible section to allow the hinged movement of the bottom wall of the mould. The tube 23 has holes which register with corresponding holes in the bottom wall of the casing for communicating tube 23 with the mould interior and at the locations of these holes the tube is fitted with spring loaded plungers 55 for rupturing the film P lining the bottom of the mould, as described below with particular reference to FIG. 12.

Figure 10:
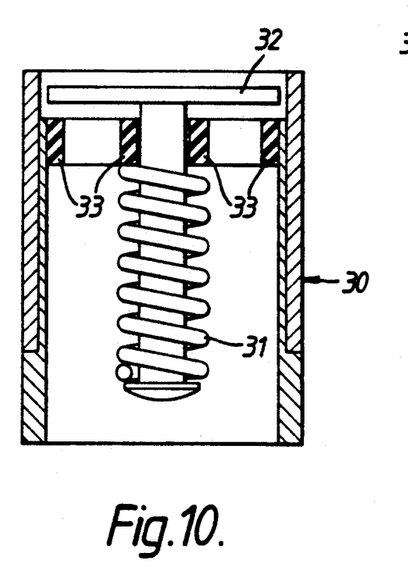
FIG. 10 is a vertical cross-section of a gas valve in the mould.
Figure 11:
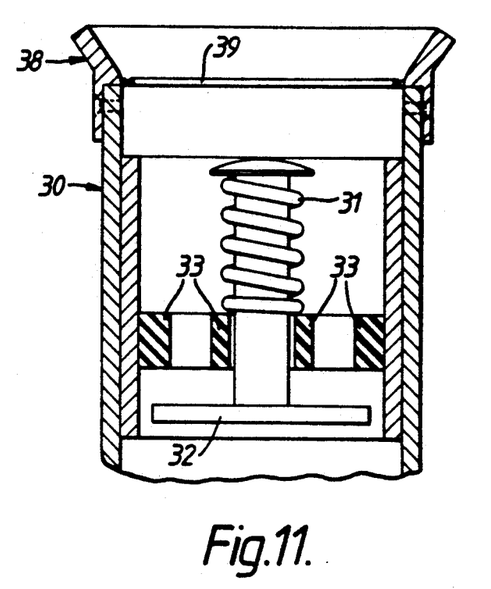
FIG. 11 is a vertical cross-section of another gas valve in the mould.
Figure 14:
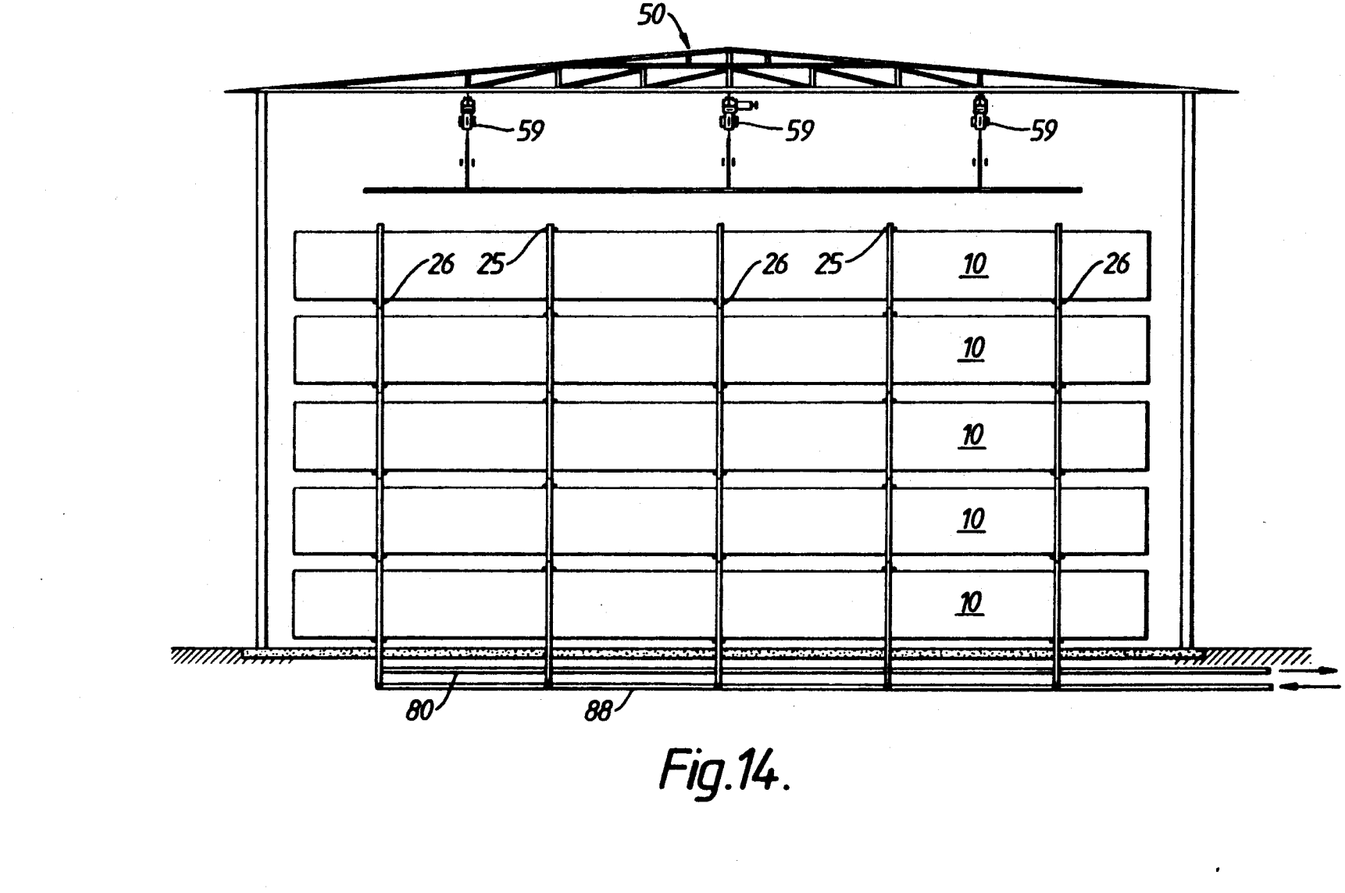
FIG. 14 is a side elevation of the curing station showing the stacking arrangement of the moulds in which the foam is curing.

Each of the vertical tubes 22, has a valve 25 at its upper end and a further valve 26 at its lower end, and the vertical tubes 24 are each similarly fitted with a valve 27 at the upper end and a valve 28 at the lower end. The valves 25-28 are preferably arranged to be normally close and to be opened automatically when required, as will become clear from the description which follows. Thus, the valves 25 and 27 at the tops of the tubes 22, 24 may be as shown in FIG. 11 and designated by the numeral 30 therein. The valve is illustrated in an open position. A spring 31 biases a sealing plate 32 against an apertured seat which may comprise O-ring seals 33 or flat washers surrounding the apertures and made of rubber or VITON which is a synthetic rubber-like product which resists solvents and TDI better than rubber. The valve is equipped with a guide cone fitted with a seal 39 to facilitate correct connection with the valve 26 or 28 at the bottom of a second mould placed on top of the first mould, the moulds being stacked one on top of the other at the curing position as shown in FIG. 14. The valves 26, 28 at the lower ends of the tubes 22, 24 may be of generally similar construction, but inverted relative to the valve shown in FIG. 11. Thus, the valves 26, 28 may be as depicted in FIG. 10.

Mould 10 is designed so that the foam never touches the top of the mould. Gases are pulled from within the mould during pouring and foaming to control the atmospheric pressure within mould 10.

Figure 13:
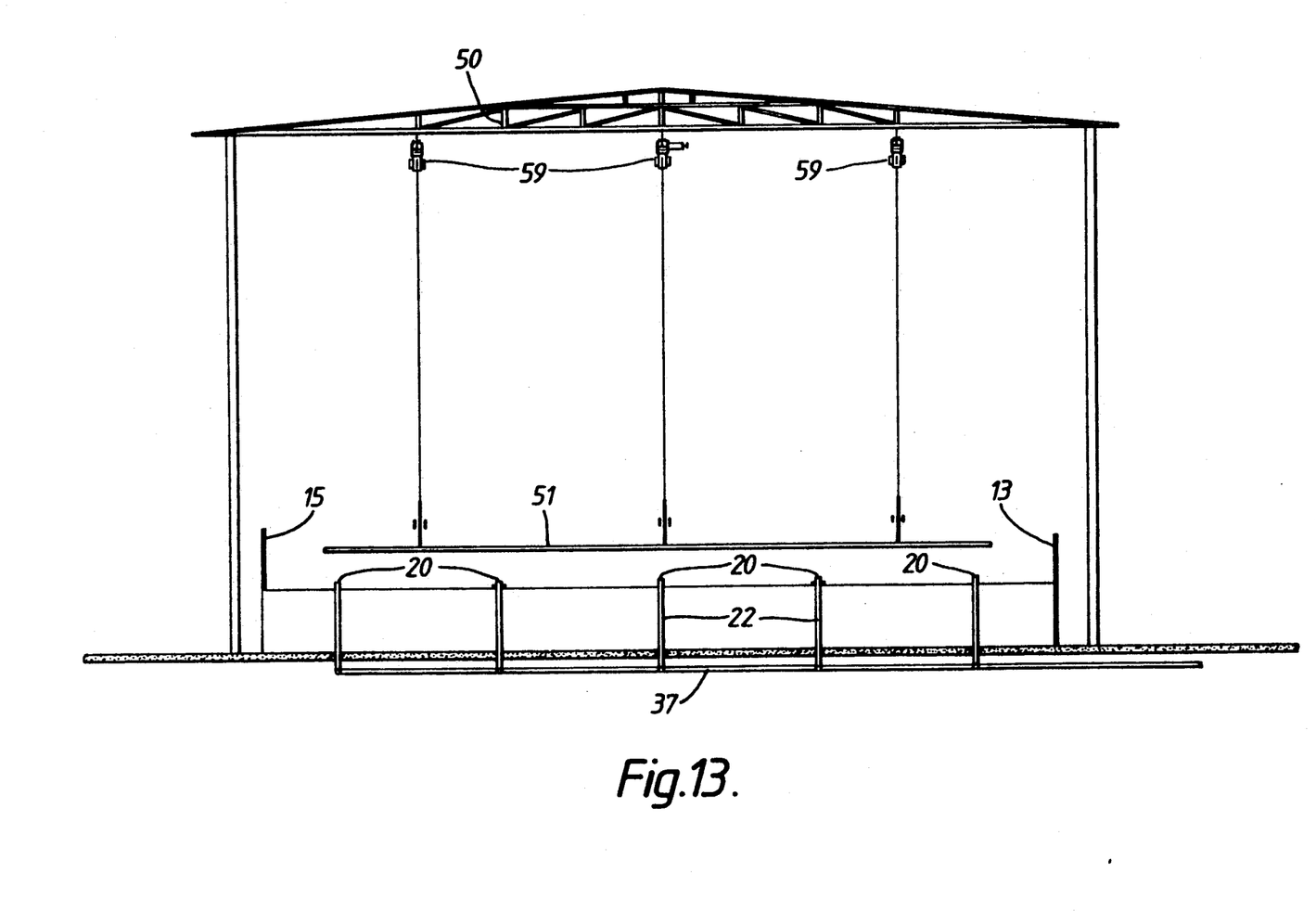
FIG. 13 is a side elevation of the crane by which the mould is removed to the curing position after moulding has occurred.

Valves 26 are arranged to be open, but the valves 25, 27 and 28 closed when the mould 10 is in its pouring position. As is best shown in FIG. 13, valves 26 of tubes 22 on the mould 10 are arranged to be cooperated with an elongate emission extraction pipe 37 on or in the floor at the filling station and through which the gases withdrawn from the top of the mould during foam laydown and expansion are conducted to a remote location for reprocessing or disposal. The extraction pipe 37 has branches which are equipped with automatically openable valves, e.g. as shown in FIG. 11, and which cooperate with the valves 26 of the respective frameworks 20.

Proper seating of the mould 10 on the pouring station causes the valves 26 to open allowing gases to be withdrawn from mould 10 as described above. At the filling or pouring station a bed is provided to give flat firm support for the mould bottom allowing it to withstand the substantial weight of the mobiles as they are transported through the mould, yet still allowing the mould to be of relatively lightweight construction so that it can be lifted and moved to the curing position when filled. The support bed includes grooves or channels which receive the frameworks 20 so the bottom wall of the mould will lie flat against the supporting surface of the bed.

When the pouring process is complete, the mould 10 just filled with foam is lifted by an overhead crane 50, as is shown in FIG. 13. The structure of mould 10 is such that it will not support its own weight when filled with foam. Therefore, crane 50 uses a pair of long lifting bars 51 each formed of 8 cm. diameter pipe which can lift mould 10 at multiple spaced-apart points. This configuration is best shown in FIG. 15, where it can be seen that mould 10 includes downwardly facing curved lifting hooks 52 which cooperate with lifting bars 51 to support mould 10 along its length.

As noted above, the bottom of the mould 10 is enclosed with a polyethylene film "P". Since gases of generation are much heavier than air it is desirable to remove the gases from the bottom of mould 10. In order to draw these chemical fumes out of the bottom of mould 10, holes are punched in the film at intervals along its length. This is accomplished by means of the punches 55 with claw-like teeth 56 thereon, illustrated in FIG. 12. The punches 55 are positioned in alignment with apertures 57 in the bottom of mould 10. The number of punches can vary based on size, spacing, etc. As the mould 10 is set down at the curing station, punches 55 are pushed upwardly against their spring bias and pass through apertures 57 so that the teeth 56 tear into and puncture the polyethylene film "P" as well as about 2.5 cm. of the foam bun itself. When the film has been ruptured gas can escape through the mould bottom into the tubes 23 and hence to the tubes 24.

Figure 15:
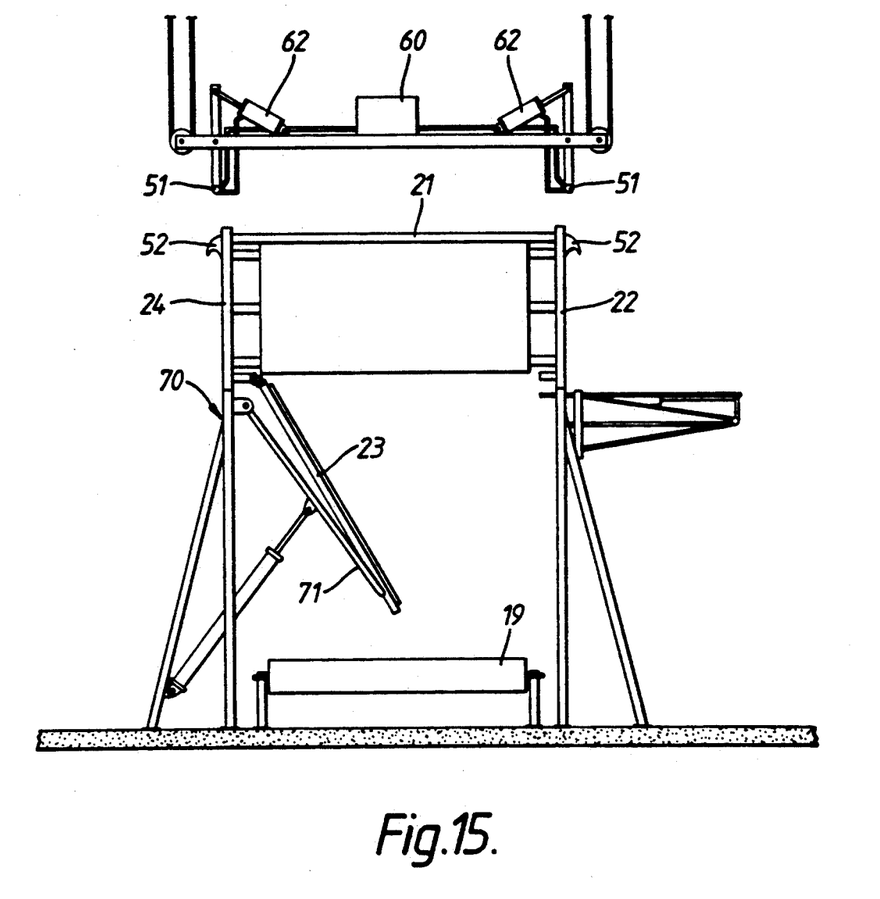
FIG. 15 is a fragmentary end view of the crane and the mould release apparatus.

According to FIGS. 13 to 15, crane 50 includes three double hoists 59 which control the lifting bars 51. Each lifting bar 51 is pressurized to 70,310 Kg./m$^2$ by a rotary air compressor 60 and therefore each lifting bar 51 functions as a supply reservoir for compressor 60. Pressurized air from the lifting bars 51 operates respective pairs of pneumatic cylinders 62 which function to latch and unlatch the lifting bars 51 from the lifting hooks 52 as is best shown in FIG. 15.

The hoists 59 are aligned with proximity switches located at each pick-up or drop point. Hoists 59 each have a directional encoder for up and down positioning and are operated by synchronous motors. These elements are not shown in the drawings.

As depicted schematically in FIG. 14, at the curing station, the vertical tubes 24 at the left side of the mould interconnect with an extraction pipe 80 through which gases flow away from the moulds for disposal or recovery, the valves 28 at the lower ends of these tubes being opened automatically. The tubes 22 at the right side of the mould are connected with a gas pipe 88 through which conditioned gas, e.g. dry air may be introduced into the tops of the moulds for controlling pressure within the mould and/or to be drawn down through the foam to improve the removal of generation gases, the valves 26 of the tubes being opened automatically.

It will be appreciated that when one mould is set down upon another mould at the curing position all the upper valves 25, 27 of the lower mould and the lower valves 26, 28 of the upper mould will be opened automatically to establish the connections of the upper mould with the gas pipes 80, 88. The gas pipe 80 leads to adsorption beds via a sacrificial carbon filter, fans being included to draw the gases from the moulds through the pipe 80.

Figure 16:
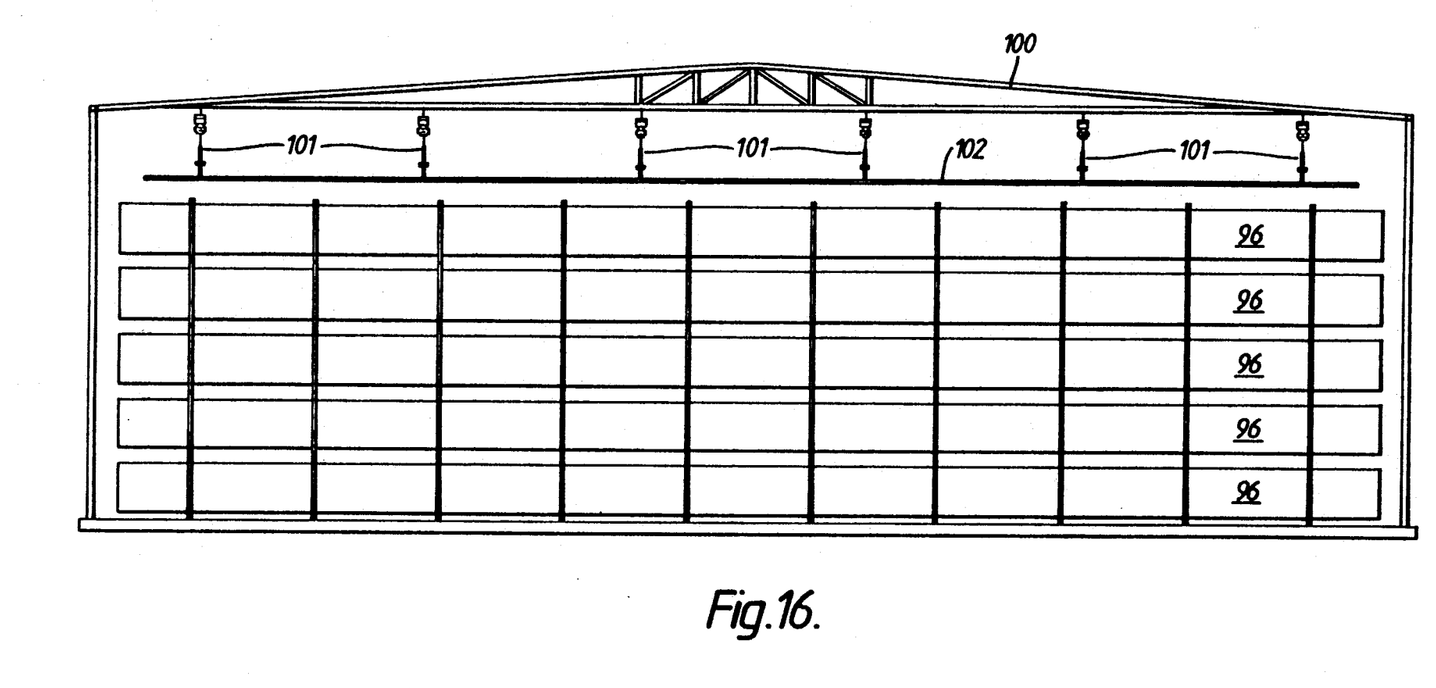
FIG. 16 is a side elevation of a curing station as in FIG. 14 but with longer moulds.

As is shown in FIG. 16, a longer mould 96 having the same characteristics as the mould 10 described above except for length is moved by a crane 100 have 6 spaced-apart hoists 101 carrying a pair of lifting bars 102.

When the foam in a mould 10 is fully cured, crane 50 moves the mould to conveyor 19, shown in FIG. 15. Mould 10 is placed on a support frame 70. The bottom wall of mould 10 is then unlatched and hinged downwardly by pneumatically controlled arms 71 spaced, for example, every 3 metres along the mould 10. The foam bun in mould 10 is permitted to fall in a controlled manner onto conveyor 19.

Figure 17:
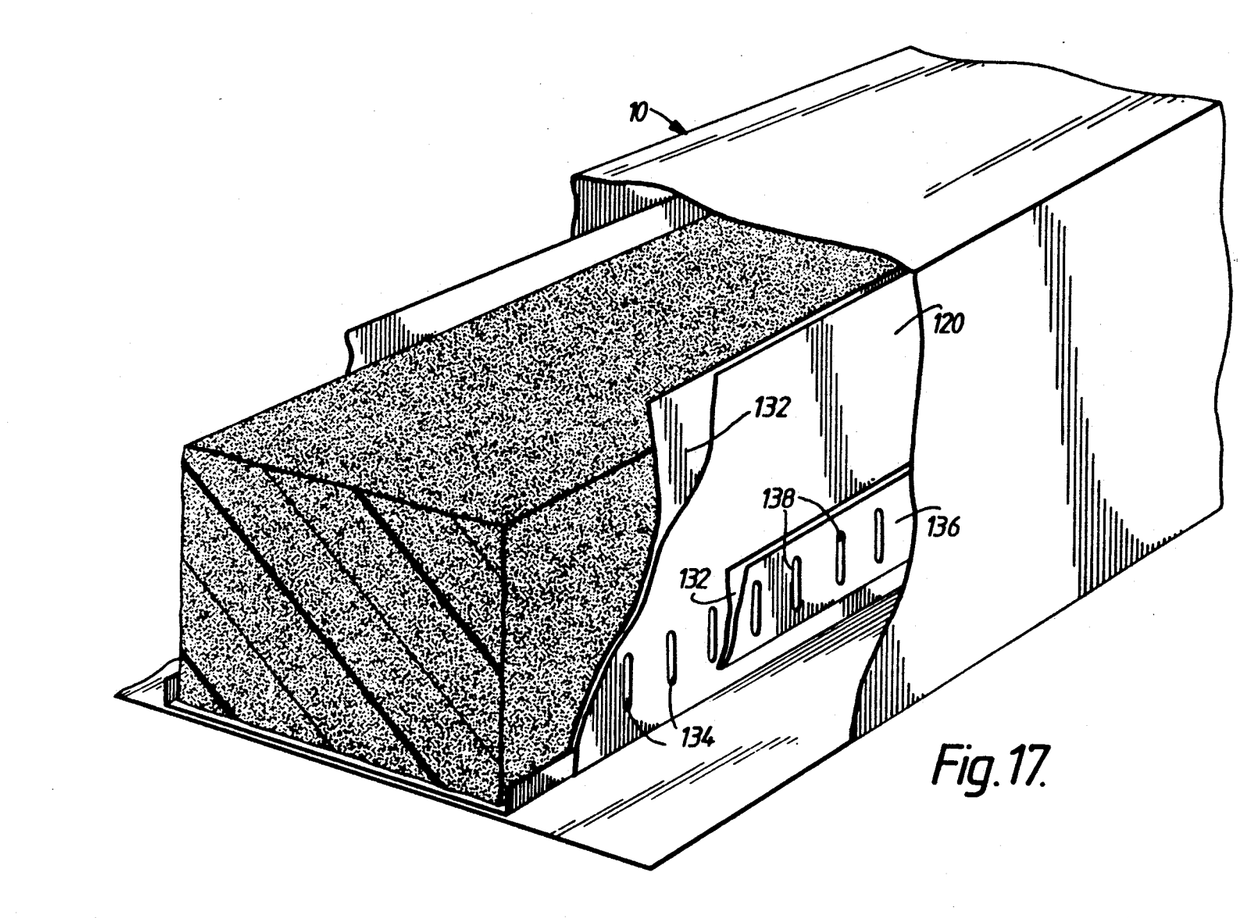
FIG. 17 is a partly cut away schematic perspective view of a modified mould.
Figure 18:
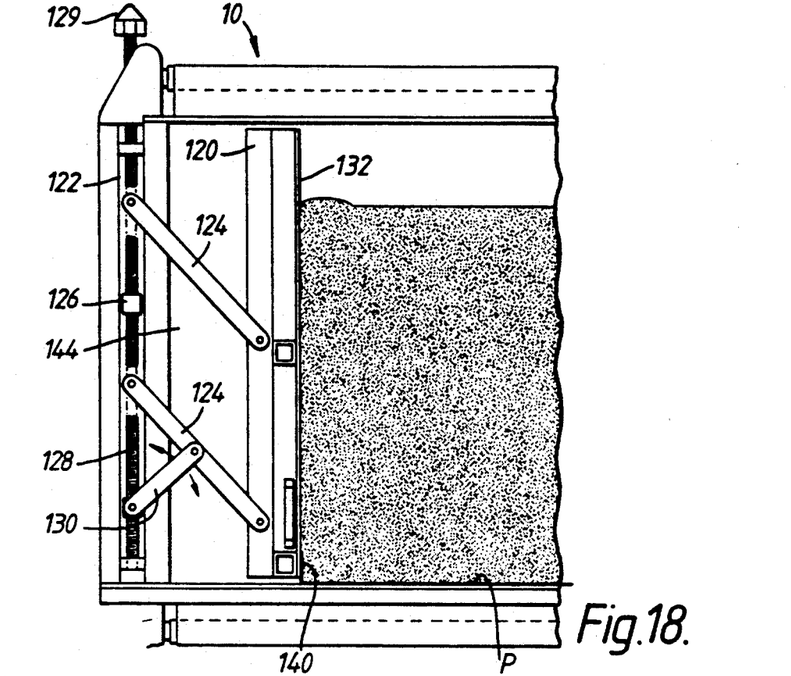
FIG. 18 is a partial transverse cross-section through the mould of FIG. 17.
Figure 19:
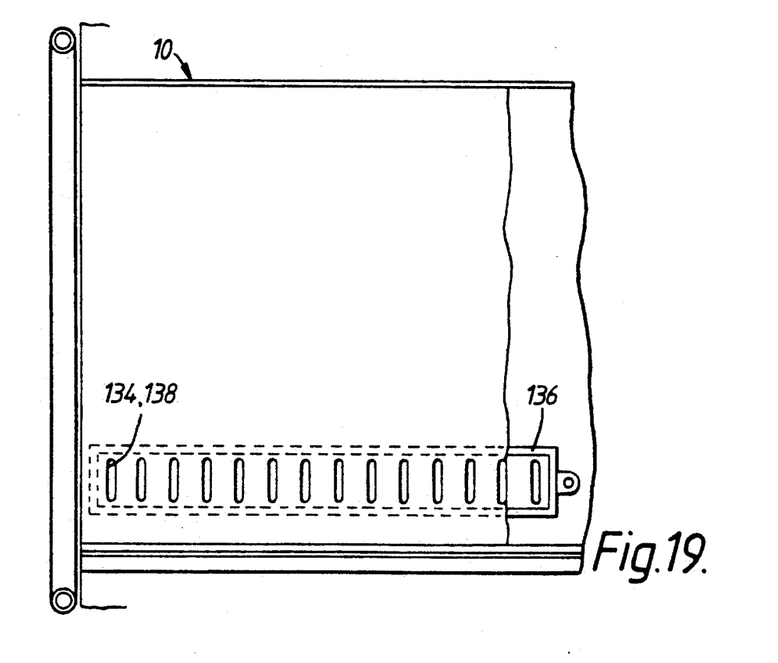
FIG. 19 is a partial side view of the mould of FIG. 17.

A modified mould is illustrated in FIGS. 17 to 19. Within the sheet metal casing defined by top, bottom and opposed side walls of the mould there are opposed inner side walls 120 coupled to the respective outer side walls 122 by pairs of parallel link arms 124 having their inner ends pivoted to the inner side walls 120, and their outer ends pivoted to a slide block incorporating a nut 126 threaded on a rotatable lead screw 128 journalled on the outer side wall. The slide block is guided for vertical movement in response to rotation of the lead screw. As shown in FIG. 18, an additional pivotal link arm 130 extends between the outer side wall and the mid-point of the lower arm 124, and the link arms 124, 130 combine to ensure that the inner side wall remains upright as it is moved inwardly and outwardly relative to the outer side wall by the lead screw mechanism. The upper end of the lead screw is equipped with a drive connector 129 for coupling with a driving unit which may be computer controlled and carried by the overhead crane. This enables the effective moulding width of the mould 10 to be changed to that required by adjusting the inner side walls inwardly or outwardly accordingly during transportation of the mould from the curing or a storage location to the filling station. Furthermore, the inner side walls 120 can be moved inwardly a small amount, e.g. by 2-3% of the moulded block width, upon the block reaching its full height, which can help in ensuring a skin of minimum thickness on the foam block after it has completely cured. This inward displacement of the inner side walls is performed during carriage of the mould from the filling to the curing station.

The inner side walls 120 have their inside surfaces lined with a non-stick layer 132 provided by a self-adhesive glass-reinforced Teflon (p.t.f.e.) tape which facilitates removal of the moulded block and contributes to attainment of good skin properties.

At a small distance above their lower edges the inner side walls are provided with vent openings conveniently formed by a longitudinal row of spaced parallel slots 134 extending along the entire length of the mould. For opening and closing these slots a similarly slotted shutter plate 136 is slidably mounted on the exterior of the inner side wall for movement between a closed position in which the plate covers the slots 134 and an open position in which the slots 138 in the plate register with the slots 134 in the side wall. The surface of the shutter plate confronting the inner side wall 120 is also covered with glass reinforced Teflon tape 132 to deter the foam sticking to the plate and impeding its opening. The slots 134 are positioned to be above the top edges of the turn ups 140 formed at the sides of the mould when the polyethylene film liner P is layed along the bottom of the mould.

It will be appreciated that the slots 34 and shutter plate 136 obviate the need to puncture the liner film P for extraction of the gases of generation during curing of the foam, and thus they are an alternative to the punches 55 described above and shown in FIG. 12. The shutter plates 136 are adjusted to their closed positions when the mould is disposed at the filing station and during the filling process. They remain closed while the filled mould is conveyed to the curing station and upon being set down at the curing station the shutter plates are slid to their open positions by an appropriate actuating mechanism. The gases exhausted through the slots 134, 138 are conducted to the vent tubes (not shown) of the mould, possibly passing to these tubes via the spaces 144 between the inner and outer side walls, and the gas extraction proceeds essentially as described above. Alternatively and/or additionally these spaces 144 may serve to collect gases from the top of the mould during the lay-down of the foam and its expansion in the mould.

Figure 20:
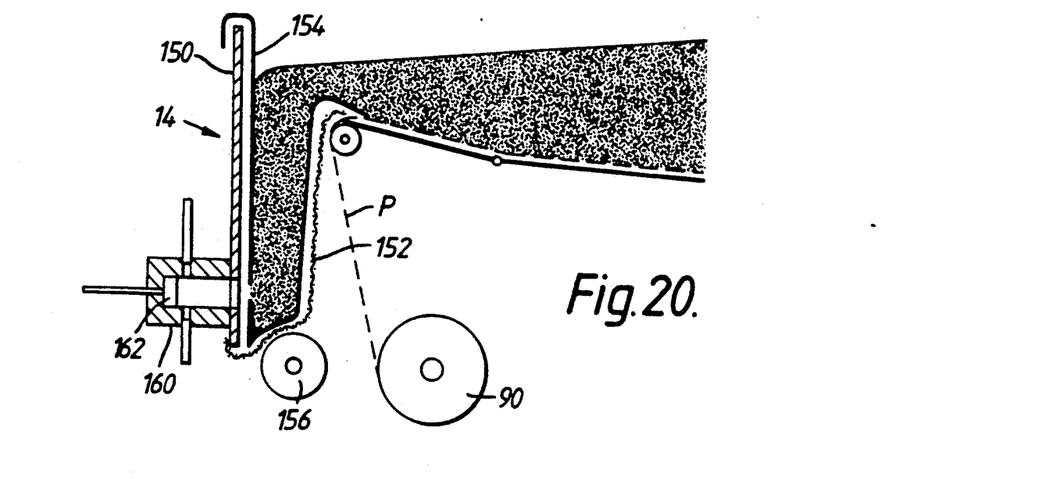
FIG. 20 is a schematic cross-section illustrating a preferred mixing head and foam trough.
Figure 21:
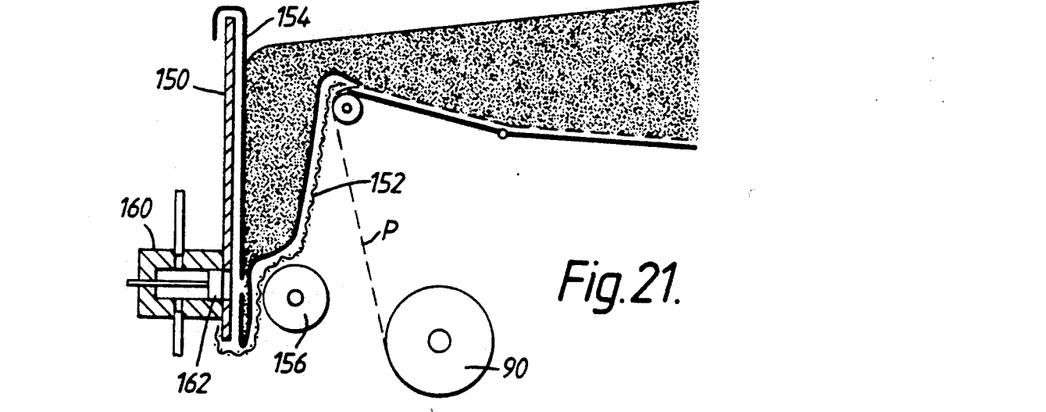
FIGS. 21 and 22 are views similar to FIG. 20 showing the trough at successive stages during emptying.
Figure 22:
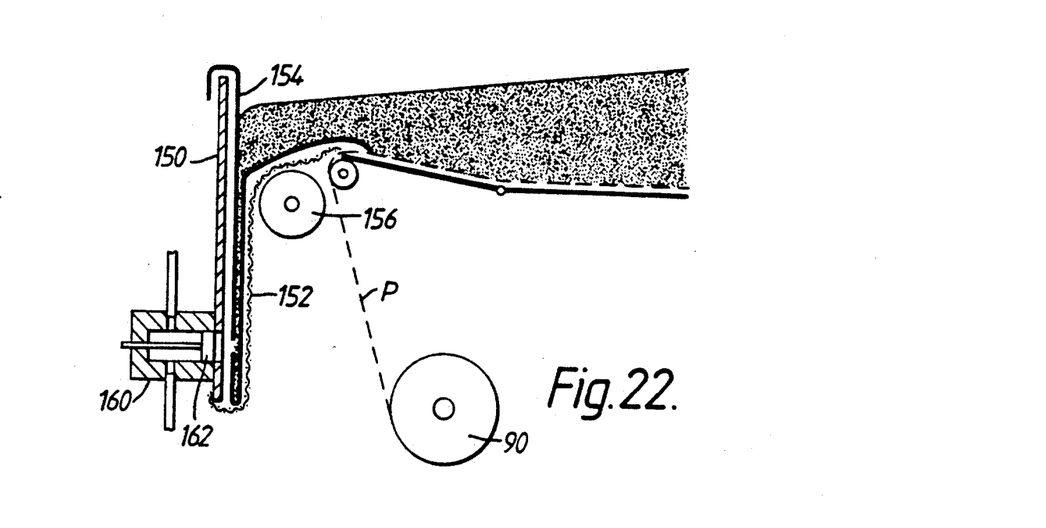

As stated above, when the mobiles reach the rear end of the mould, the foam is emptied out of the trough 14 onto the fall plate mobile 11. FIGS. 20-22 illustrate a trough assembly equipped with means for emptying the trough. The trough comprises a rigid back plate 150, and a movable front wall capable of being displaced from a normal, in use, position defining an open-topped trough chamber with the back plate and an emptying position lying substantially flat against the back plate to collapse and empty the trough of its contents. As shown the front wall is a flexible sheet constituted by a steel wire mesh 152 having a lower edge attached to the lower edge of the back plate and an upper edge held fixed at a position spaced forwardly from the back plate and near the top of the fall plate. Within the trough chamber defined by the back plate and front wall is inserted a liner 154 of flexible sheet material, e.g. polyethylene, this liner having a lip arranged to project forwardly over the bottom liner film P delivered from the roll 90. A device for collapsing the trough is provided and comprises a roller 156 mounted on the mobile 12 for vertical movement parallel to the front face of the back plate 150. In a normal position the roller is located at its lowermost position adjacent the bottom edge of the back plate 150 and the trough can fill with foam, as illustrated in FIG. 20. When the trough is to be emptied the roller is driven upwardly and causes the wire mesh 152 to be progressively displaced against the back plate 150 and hence the liner 154 to be gradually collapsed from its bottom to expel the contents of the trough. In the uppermost position of the roller, shown in FIG. 22, the trough is essentially emptied of foam.

As illustrated in FIGS. 20 to 22, the trough assembly also incorporates a novel form of mixer unit for mixing the foam constituents prior to delivery to the trough. It comprises a cylinder 160 mounted directly on the back plate 150 of the trough and having an axial outlet for discharging the foam mixture through a hole in the back plate, and a corresponding hole in the liner 154, into the trough. Accommodated in the cylinder 160 is a piston 162 which can be advanced from the retracted position shown in FIG. 20 to empty the contents of the cylinder into the trough 14. The cylinder is provided with ports for delivery of the liquid constituents into the mixing chamber defined by the cylinder from suitable metering devices. The mixing chamber is devoid of any mechanical mixing element and is arranged to mix the liquids under the effect of high pressure (50-80 bar) metering of polyol premix, TDI, water, etc. and impingement of the liquid streams on entry into the mixing chamber. The mixing chamber can have a very small volume, e.g. 1 dm$^3$.

When the trough 14 is to be emptied as described above, the supply of chemicals to the mixing chamber is interrupted and the piston 162 is driven forwardly to discharge the contents of the chamber into the trough. The roller 156 is then activated to empty the trough.

The described mixing head and its mounting directly on the trough has the advantage of minimising the "dead" volume which must be flushed and cleaned after mould filling, whereby usage of foam chemicals is optimised and the consumption of solvents for cleaning is substantially reduced and could even be eliminated.

A method and apparatus for moulding foam is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims. For example it is not necessary for the valves to be of the spring loaded type and they could alternatively take the form of flapper valves which could be arranged to be opened automatically by cable and lever mechanisms.

I claim:

1. A plant for production of large blocks of polymeric foam for subsequent cutting into small blocks or sheets, comprising:
   (a) a mold filling station;
   (b) a curing position remote from the filling station;
   (c) a movable mold having top and bottom walls connected by opposite side walls and end walls;
   (d) gas venting means for venting gases from the interior of the mold;
   (e) means for charging the mold with foam to form in the mold a foam bun having an upper surface spaced from the top wall of the mold, said charging means including a mobile trough and fall plate transportable along the mold from one to the other end of the mold for laying down partially expanded foam over the bottom wall of the mold;
   (f) means to deliver foam reactants to the trough as the trough and fall plate are transported along the mold;
   (g) mold conveying means for conveying the mold from said filling station at which the mold is located during charging with foam to said curing position remote from the filling station;
   (h) gas exhausting means located at the filling station for connection to the venting means of the mold for conducting gases away from the interior of the mold above the foam therein as the mold is charged with foam; and
   (i) gas supply and extraction means at the curing position for connection to the venting means of the mold for supplying gas to the interior of the mold above the foam bun and for drawing gases from the foam near the bottom wall of the mold and extracting said gases from the mold, the mold including valve means for closing the venting means to seal closed the mold during transfer of the mold from the filling station to the curing position.

2. A plant according to claim 1, wherein the gas venting means of the mold comprises first and second connection ports controlled by respective valves, the first port being connected to the gas exhausting means when the mold is at the filling station and being connected for supply of gas therethrough into the mold when the mold is at the curing position, the second port being closed by its valve when the mold is at the filling station and being opened for extraction of gases when the mold is at the curing position, and said valve closing the first and second ports during movement of the mold from the filling station to the curing position.

3. A plant according to claim 1, wherein the mold comprises substantially planar top, bottom and opposed side walls forming a mold casing, and external framework means cooperating with said mold casing for reinforcing the mold casing.

4. A plant according to claim 3, wherein the bottom wall of the casing is openable for removing a cured foam bun from the mold through the bottom thereof.

5. A plant according to claim 4, wherein the bottom wall is hinged along one side of the casing for pivotal movement between open and closed positions.

6. A plant according to claim 3, 4 or 5, wherein the framework means includes said gas venting means.

7. A plant according to claim 2 wherein the gas venting means comprises vertical tubes at the side of the mold respectively communicating with upper and lower parts of the mold interior, and each said vertical tube having a first valve at an upper end thereof and a second valve at the lower end thereof to enable a plurality of like molds to be stacked upon one another with their vertical tubes connected together.

8. A plant according to claim 3, wherein said external framework means includes framework members spaced apart along the casing, each framework member including an upper transverse tube communicating with the interior of the mold through openings in the top wall of the mold casing, a lower transverse tube for communicating with the interior of the mold through openings in the bottom wall of the mold casing, and vertical tubes located on opposite sides of the mold casing and connected to the respective transverse tubes, the valve means being located in the vertical tubes.

9. A plant according to claim 8, wherein each vertical tube has a first valve at the upper end thereof, and a second valve at the lower end thereof, to enable a plurality of like molds to be stacked one upon another with their vertical tubes connected together.

10. A plant according to claim 3, wherein inner side walls are provided in the mold casing and are movable towards and away from each other to adjust the width of the mold.

11. A plant according to claim 10, including means connecting each inner side wall to the adjacent outer side wall of the casing and adjustable to move the inner side wall towards and away from the outer side wall.

12. A plant according to claim 11, wherein said connecting means comprises parallel ink arms having first ends pivoted to the inner side wall, and second ends coupled to a mechanism for adjusting said arms to move the inner side wall.

13. A plant according to claim 12, wherein said mechanism comprises a lead screw journalled on the outer side wall and a slide block guided for vertical movement on the outer side wall, the second ends of the link arms being pivoted to the slide block and the side block comprising a nut threaded on the lead screw.

14. A plant according to claim 1, including means for perforating a bottom liner in said mold for allowing gases of generation to escape therefrom.

15. A plant according to claim 1, wherein at least one side wall confining the molding channel has vent openings adjacent the bottom edge thereof, and means for opening and closing said openings.

16. A plant according to claim 15, wherein a series of said vent openings are provided along the side wall, and the means for opening and closing said vent openings comprises a plate with holes therethrough, the plate being movable to bring the holes therein into and out of registration with the vent openings to open and close said openings.

17. A plant according to claim 1, wherein the conveying means comprises an overhead crane.

18. A plant according to claim 17, wherein the mold includes inner side walls and a mechanism coupled thereto for adjusting said side walls towards and away from each other, and drive means are provided on said crane for operating the mechanism to move the inner side walls of the mold during transportation of the mold by the crane.

19. A plant according to claim 1, 17, or 18, wherein a support bed is provided at the filling station, said support bed shaped to give flat support to the bottom wall of the mold casing, said support bed being recessed to accommodate any mold elements located beneath the bottom wall.

20. A plant according to claim 17 or 18, wherein a mold unloading station is provided at a location between the filling station and the curing position.

21. A plant according to claim 17 or 18, wherein the trough is collapsible to expel the foam mixture therefrom for emptying the trough.

22. A plant according to claim 21, wherein the trough comprises a rigid back plate and a front wall member movable against the back plate to collapse the trough.

23. A plant according to claim 20, wherein the front wall member is flexible, and displacing means are carried by said mold and provided for progressively displacing the front wall member towards the back plate from the bottom of the trough towards the top thereof.

24. A plant according to claim 23, wherein the displacing means comprises a roller and roller movement means for moving the roller upwardly substantially parallel to the back plate.

25. A plant according to claim 21, wherein the trough includes a liner of flexible sheet material for containing foam mixture in the trough.

26. A plant according to claim 1, wherein the trough has a mixing unit mounted thereon for delivery of foam mixture directly into the trough.

27. A plant according to claim 26, wherein the mixing unit comprises a chamber arranged to mix liquid streams by impingement thereof upon delivery of the mixing chamber through respective inlets.

28. A plant according to claim 27, wherein the mixing unit includes means for discharging the contents of the chamber into the trough to empty the chamber.

* * * * *